United States Patent Office 3,446,766
Patented May 27, 1969

3,446,766
TREATMENT OF LINEAR POLYESTER WITH COPPER SALT AND ALKALI METAL IODIDE
Robert Edward Taylor, Camden, S.C., assignor to E. I. du Pont de Nemours and Company, Wilmington, Del., a corporation of Delaware
No Drawing. Continuation-in-part of application Ser. No. 410,279, Nov. 10, 1964. This application Aug. 7, 1967, Ser. No. 658,611
Int. Cl. C08g 17/14; B29f 3/00
U.S. Cl. 260—22                    7 Claims

ABSTRACT OF THE DISCLOSURE

An improvement in the process of preparing polyester filaments is disclosed for providing reinforcing yarns and cords of polyester having low free-carboxyl-group contents which give superior performance in pneumatic tires and other reinforced rubber articles where heat-degradation is a problem. A copper salt of an organic carboxylic acid and a molar excess of alkali metal iodide are mixed with fully polymerized, molten polyester to reduce the free carboxyl groups prior to melt spinning. If desired, the metal iodide may be present during formation of the polyester.

CROSS-REFERENCE TO RELATED APPLICATION

This application is a continuation-in-part of my co-pending application Ser. No. 410,279, filed Nov. 10, 1964, and now abandoned.

BACKGROUND OF THE INVENTION

Field of the invention

This invention relates to improved polyester fibers suitable for reinforcing rubber articles. More particularly, this invention relates to a method for preparing synthetic polyester fibers having a low concentration of free carboxyl groups.

Description of the prior art

Synthetic polyesters, e.g., polyethylene terephthalate, in the form of fibers, yarns and cords have been found to be excellent materials for reinforcing rubber articles. The rapidly increasing public use of polyester reinforcing materials makes it highly desirable that polyester fibers having the best possible properties be provided. The unexpected susceptibility of conventional polyester fibers to heat-degradation in contact with rubber is described by Daniels in U.S. Patent No. 3,051,212, granted Aug. 28, 1962. The patent discloses improved polyester fibers, having unusually low concentrations of free carboxyl groups in the polymer, which give superior performance under such conditions. Useful methods for preparing polyester fibers having low concentrations of free carboxyl groups are disclosed in the Daniels patent, but alternative methods are vitally needed to provide greater flexibility in yarn manufacturing processes.

SUMMARY OF THE INVENTION

The present invention provides a convenient and efficient method for preparing polyester shaped structures having very low concentrations of free carboxyl groups. Furthermore, the invention provides polyester fibers which have enhanced resistance to the formation of additional carboxyl groups upon heating to elevated temperatures. The polyester fibers provided by the invention are useful in a variety of industrial applications to provide polyester-reinforced rubber articles having improved performance. Other advantages of the invention will become apparent from the following description of the invention.

It has now been discovered that a marked reduction in the free carboxyl content of a synthetic linear condensation polyester can be achieved by incorporating in the fully polymerized molten polymer a copper salt of an organic carboxylic acid and an iodide anion and that shaped structures of the resulting low-carboxyl content polyesters exhibit enhanced resistance to hydrolytic degradation. Furthermore, the polyester is highly resistant to the formation of additional free carboxyl groups upon exposure of the structure to elevated temperatures.

Accordingly, the present invention is the improvement, in conventional processes for preparing filaments or other shaped articles of highly polymeric synthetic linear terephthalate condensation polyester, of adding to the polyester a copper salt of an organic carboxylic acid and an alkali metal iodide, preferable potassium iodide, the copper salt being added to the fully polymerized polyester in an amount providing 15 to 400 parts per million of Cu based on the weight of polyester and the iodide being added in molar excess, melt-mixing the polyester with the additives until the free carboxyl content of the polyester is substantially reduced, and preparing a shaped article from the modified polyester. The modified polyester produced may be melt-extruded or otherwise shaped by conventional procedures into fibers, films, bristles, rods or any other form desired.

DESCRIPTION OF PREFERRED EMBODIMENTS

It is importnt that the copper salt be added to the polyester only after the desired molecular weight has been achieved, rather than being added to the monomeric ingredients or to the polymerizing mixture early in the polymerization procedure. If the copper salt is added to the polyester before the desired molecular weight is obtained, it has been found to be extremely difficult to finish the polymerization reaction and, furthermore, fibers produced from the polymer have poor adhesion to rubber.

When the additives are incorporated in the polyester after polymerization has been completed, in accordance with this invention, no interference with adhesion to rubber is noticed.

Although the mechanism of the reaction is not fully understood, it appears that copper ions destroy free carboxyl groups by a decarboxylation reaction, and that the proper oxidation state of decarboxylation is obtained by reaction between copper ions and iodide ions. The surprisingly superior results obtained with alkali metal iodides, in comparison with other reducing agents, suggests that the iodides have the best combination of thermal stability, solubility and redox potential for this reaction in a molten polyester.

The amount of copper salt needed to carry out the present invention depends upon the original concentration of free carboxyl groups in the polyester to be treated, and upon the carboxyl group concentration desired in the final product. For most purposes it is desirable to add sufficient copper salt to give a copper concentration in the final polymer of 15 to 400 parts per million. Generally a copper concentration of 25–50 parts per million is preferred.

The alkali metal iodide should be added in molar excess. A substantial excess is desirable, e.g., such that the mol ratio of iodide ion to copper salt is at least 2:1, and preferably is at least 5:1. Higher ratios may be used as desired, but usually ratios higher than about 20:1 are inconvenient and may cause a minor reduction in ultimate yarn tensile properties. Addition of the metal iodide may be made at any time—either prior to or during polymerization, or after polymerization is completed.

Copper salts suitable for the present invention include the organic carboxylic acid salts such as copper acetate, copper benzoate, copper undecylenate, copper phthalate and copper stearate. Also included are the more weakly bonded chelate compounds of copper such as copper acetonylacetonate.

Other suitable copper salts include those prepared from organic carboxylic acids of the structure $R(CO_2H)_y$ where R is a hydrocarbon group of 1 to 20 carbon atoms and $y$ is 1 or 2. Specific examples include propionic, butyric, valeric caprioic, caprylic, palmitic, oleic, phenylacetic, and terephthalic acids.

The term "synthetic linear terephthalate condensation polyester," as used herein, comprehends a substantially linear polymer of fiber-forming molecular weight comprising recurring glycol dicarboxylate structural units in which at least about 85% of the recurring structural units are units of the formula

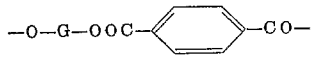

wherein —G— represents a divalent organic radical containing from about 2 to about 18 carbon atoms which is attached to the adjacent oxygen atoms by saturated carbon atoms. Preferably, the radical —G— contains from 2 to 10 carbon atoms. The terephthalate radical may be the sole dicarboxylate constituent of the recurring structural units, or up to about 15% of the structural units may contain other dicarboxylate radicals such as adipate, sebacate, isophthalate, bibenzoate, hexahydroterephthalate, and like radicals. Included, for example, are the polyesters disclosed in U.S. Patents Nos. 2,465,319, 2,901,466 and 3,018,272. Polyesters having an intrinsic viscosity of at least about 0.3 are considered to be of fiber-forming molecular weight. Intrinsic viscosity has been defined in U.S. Patent No. 3,057,827.

Glycols useful in the preparation of the polyesters and copolyesters of this invention include the polymethylene glycols such as ethylene glycol and tetramethylene glycol and branched chain glycols such as 2,2-dimethyl-1,3-propanediol and 2,2-dimethyl-1,4-butanediol. Also included are cis- and trans-hexahydro-p-xylylene glycol, bis-p-(2-hydroxyethyl)benzene, diethylene glycol, bis-p(beta-hydroxyethoxy)benzene, bis - 4,4' - (beta-hydroxyethoxy)diphenyl, 1,4-dihydroxy[2·2·2]bicyclooctane, 2,2-bis(4-hydroxyphenyl)propane, 2,2 - bis(4-hydroxycyclohexyl)propane, 1,4-cyclohexanediol, 4,4'-dihydroxybiphenyl, and (bicyclohexyl)-4,4'-dimethanol.

The term "free carboxyl groups" is used to include both the un-ionized acid group, —COOH, and the ionized group, —COO—. The determination of the concentration of carboxyl groups is made in accordance with the procedure described by Pohl in Analytical Chemistry, vol. 26, p. 1614, October 1954, and is expressed in equivalents per million grams.

The term "relative viscosity" refers to the ratio of the viscosity of a 10% solution (2.15 gm. polymer in 20 ml. solvent) of polyester in a solvent mixture of 10 parts of phenol and 7 parts of 2,4,6-trichlorophenol (by weight), to the viscosity of the phenol-trichlorophenol mixture, per se, measured in the same units at 25° C. Relative viscosity is a measure of polymer molecular weight. For high strength fibers a relative viscosity of at least 25 is preferred. In the examples relative viscosity is frequently abbreviated "RV."

The following examples are illustrative of various embodiments of the present invention.

EXAMPLE 1

The following ingredients are introduced into a distillation vessel:

|  | Lbs. |
|---|---|
| Dimethyl terephthalate (5.46 kg.) | 12.0 |
| Ethylene glycol (3.74 kg.) | 8.25 |
| Manganous acetate (3.17 gm.) | .0070 |
| Antimony oxide (2.08 gm.) | .0046 |

The mixture is heated and methanol removed as the ester interchange reaction is carried out in accordance with the teachings of U.S. 2,951,060. The resulting material is transferred to a stainless steel autoclave fitted with stirrer and vacuum system and polymerization carried out as described in U.S. 2,647,885. When the resistance to stirring indicates a polymer relative viscosity of 25–28, an additive shown in Table I is added to the polymerization mixture via an air lock and stirring continued for 30 minutes, following which the molten polymer is extruded as a ribbon, quenched, and cut to flake. Flake samples are analyzed for free carboxyl groups, with the results shown in Table I. Each of the polyesters 1a to 1e is prepared in this manner with the indicated additive. Polyester 1f, included for comparison, is polymerized in exactly the same way but no copper salt/reducing anion additive is incorporated in the molten polymer.

The data in the table clearly show the effect of the process of this invention in reducing the free carboxyl content of the extruded polyester.

TABLE I

| Code | Copper Salt | Amount Added (g.) | Iodide | Amount Added (g.) | Free Carboxyl Content Eq./$10^6$ gms. |
|---|---|---|---|---|---|
| 1a | Copper acetate·$H_2O$ | 0.55 | KI | 5.5 | 11.4 |
| 1b | Copper benzoate | 0.83 | KI | 5.5 | 10.9 |
| 1c | Copper undecylenate | 1.18 | KI | 5.5 | 8.2 |
| 1d | Copper phthalate | 2.08 | KI | 5.5 | 7.0 |
| 1e | Copper acetonylacetonate | .73 | KI | 5.5 | 12.3 |
| 1f | None (for comparison) | | | | 18.8 |

EXAMPLE 2

This example illustrates the use of a preferred copper salt. The general procedure of Example 1 is repeated with the exception that polymerization is carried out for a longer period of time to form polymers having a relative viscosity of about 30–35 before the copper salt and potassium iodide are added. At this point copper stearate is added in sufficient amount to give 32 p.p.m. Cu in the finished polymer, and 0.1% by weight of potassium iodide based on the weight of polymer is added. Analysis of flake samples shows that the polymer has 16 COOH eq./$10^6$ g. at 46.3 RV. A comparison sample prepared in an identical manner with the exception that copper stearate and potassium iodide are omitted is found to have 39.8 COOH eq./$10^6$ at a 43.7 RV.

EXAMPLE 3

This example illustrates the necessity of the presence of an iodide ion in practicing the invention and compares its effect with that of other halides.

The general procedure of Example 1 is repeated with the exception that polymerization is carried out for a longer period of time to give polymers having a relative viscosity of about 30 before adding the copper salt and the indicated halide. Polymerization and stirring are continued for 30 minutes before extruding the finished polymer. Copper stearate is added in sufficient quantity to give 50 parts per million copper in the polymer, and the halides are added in the amounts indicated in the table. Analysis of the polymer flake for free carboxyl concentration gives the results shown in the table.

TABLE II

| Halide | Weight Added, Grams | COOH, e.q./10⁶ Grams |
|---|---|---|
| KCl | *2.4 | 20.8 |
| KBr | *3.9 | 21.5 |
| KI | 5.4 | 10.2 |
| KI | 2.7 | 17.8 |
| KI | 8.1 | 5.0 |
| None | | 31.9 |

*Equimolar to 5.4 grams KI.

Inspection of the data in the table reveals that, at equivalent molar concentrations, KCl and KBr are only half as effective as KI in the decarboxylation reaction.

EXAMPLE 4

This example illustrates the importance of carrying the polymerization to the desired polymer molecular weight before adding the copper salt to the polymer.

The general procedure of Example 1a is repeated, except that the copper acetate and potassium iodide are added to the monomeric material *before* polymerization is carried out. It is found that 4 to 5.5 hours' polymerization time is required to produce polymer with 26–29.5 RV, whereas, when the copper acetate and potassium iodide are not added until after the desired relative viscosity is reached, i.e., as in Example 1, it is found that only 2 to 2.5 hours' polymerization time is required to produce polymer with 25 to 27.7 RV. It is thus noted that an additional 2–3 hours' residence time in the polymerization vessel is required in the presence of copper acetate to achieve relative viscosities equivalent to those produced when the additives are not present during polymerization.

An even more serious effect of adding the copper salt before polymerization is carried out is noted when attempts are made to adhere the fibers produced to rubber. As an illustration of this, the monomeric material prepared by heating dimethylterephthalate and ethylene glycol in the presence of catalyst, until the exchange reaction is complete and all methanol is distilled out of the reaction vessel, is transferred to an autoclave and stirred with a glycol mixture containing 0.03 mol percent (based upon final weight of the polymer) cupric acetate and 0.03 mol percent potassium iodide. Heating is continued under reduced pressure until the desired degree of polymerization is obtained. The polymer produced is melt-spun and drawn into an 1100 denier (120 tex.) yarn which is plied and twisted to give an 1100/2 tire cord. The cord is coated with a blocked isocyanate/polyepoxide adhesive precoat and overcoated with a standard resorcinol-formaldehyde-latex adhesive by the procedure as disclosed by Shoaf in French Patent No. 1,340,332, using a stretch of 2% at 210° C. with an exposure time of 45 seconds. The treated cord is then tested for adhesion to rubber in the single-end-strip-adhesion test by the procedure of the Shoaf patent and found to have a SESA value of 2.8 lb. (1.27 kg.). A similar yarn (control prepared in the same manner but with no copper acetate-potassium iodide added) gives the much higher SESA value of 8.8 lb. (4 kg.) in the same test.

In contrast to the above results, a polyethylene-terephthalate tire cord containing copper acetate and potassium iodide added in accordance with the present invention, i.e. wtih the copper acetate added after polymerization is completed, gives adhesion values in the SESA test substantially the same as those shown by similar (control) cords which contain no copper additive.

EXAMPLE 5

The general procedure of Example 1 is repeated with the exception that polymerization is carried out for a longer period of time to give polymers having a relative viscosity of about 30 before the copper salt is added. Three polymer batches are prepared with sufficient copper undecylenate being added to give concentrations of copper in the final polymer of 48 parts per million, 32 parts per million, and 16 parts per million. Potassium iodide is added to each polymer batch in amounts of 0.1% by weight of the polymer. For comparison, another polymer batch is prepared in which the process is repeated in all details except that no copper salt or potassium iodide is added. Analysis of the polymer flake for free carboxyl group concentration gives results shown in the following table.

TABLE III

| Code | Copper Concentration, Parts per million | Free Carboxy Concentration, Eq./10⁶ Grams |
|---|---|---|
| 5a | 48 | 11 |
| 5b | 32 | 17 |
| 5c | 16 | 27 |
| 5d | *0 | 39 |

*For comparison.

EXAMPLE 6

Bis-β-hydroxyethylterephthalate is prepared continuously from ethylene glycol and dimethyl terephthalate by the method of Vodonik, U.S. Patent No. 2,829,153, using a catalyst comprising manganous acetate and antimony oxide. This monomer is then supplied continuously to a polymerization system where the temperature is raised and the pressure reduced to produce high molecular weight polyethylene terephthalate. In the early stages of polymerization a glycol dispersion of $TiO_2$ is added to the polymerization mixture along with potassium iodide in proportions corresponding to concentrations of 0.1% $TiO_2$ and 0.05% KI by weight of the final polymer. The final stages of polymerization are carried out at a temperature of about 305° C. and a pressure of about 1 mm. of mercury using the finishing apparatus of Willey, U.S. Patent No. 3,046,099, using a residence time of about 2 hours. The outlet end of the finisher is fitted with a screw pump similar to that described by Bendett in U.S. Patent No. 2,805,627 to facilitate the transfer of the finished polymer directly to the spinning machine. Copper stearate is then introduced into the molten polymer at the upstream end of the screw pump so that it becomes thoroughly dispersed in the polymer by the action of the pump and is maintained in contact with polymer for approximately 5 to 15 minutes. The amount of copper stearate added corresponds to a copper concentration in the polymer of about 50 parts per million.

The molten polymer is transferred directly to a spinning machine and extruded through a 192-hole spinneret, and the yarn produced is found to be composed of a polymer having a relative viscosity of 44, a free carboxyl concentration of 17.1 eq./10⁶ gm. and 57 p.p.m. Cu by analysis.

The effectiveness of the copper stearate/potassium iodide additive in reducing the free carboxyl content of polyethylene terephthalate is shown by comparison tests. A second yarn sample prepared under exactly the same conditions as above, but with no copper stearate added, is found to have a relative viscosity of 46 and a free carboxyl content of 40. A third sample prepared exactly as the first sample above, with the exception that neither copper stearate nor potassium iodide is added, is found to have a relative viscosity of 49 and a free carboxyl content of 40. Another sample was prepared exactly as the first sample except that both copper stearate and potassium iodide were added along with the $TiO_2$ dispersion during the early part of the polymerization reaction, the amounts corresponding to 0.1% $TiO_2$, 5 parts per million copper and 0.1% KI by weight of the final polymer. The presence of even this small amount of copper resulted in inability to polymerize the mixture to a relative viscosity higher than 40.

EXAMPLE 7

Polyethylene terephthalate flake prepared by the general procedure of Example 1 and using amounts of additive, based on the weight of polymer, of 0.1% by weight of potassium iodide and 32 parts per million copper, the latter being added as copper phthalate after a completion of the polymerization, is melt spun and drawn to give a 97-filament yarn having a denier of 420. The yarn is plied and twisted to 840 denier, and then cabled to give a 1700-denier tire cord. The cord is precoated with a blocked isocyanate/polyepoxide mixture and overcoated with a standard resorcinol-formaldehyde-latex adhesive according to the procedure described by Shoaf French Patent No. 1,340,352. The coated cord is tested for adhesion in a standard tire manufacturing rubber formulation. Both H-pull tests and single-end-strip-adhesion tests are carried out on the sample according to the procedure described in the Shoaf patent. The results are shown in Table IV in the column headed "Test cord." The table also includes comparable results for a "Comparison cord" prepared from polyethylene terephthalate flake containing no copper phthalate/potassium iodide additive.

TABLE IV

| Property Measured | Test Cord | Comparison Cord |
|---|---|---|
| Relative Viscosity | 22.3 | 23.3 |
| Tenacity, g.p.d. | 5.6 | 6.1 |
| Break Elongation, percent | 14.2 | 14.4 |
| Carboxyls, Eq. $10^6$ gram | 9.2 | 43.2 |
| SESA:* | | |
| Cold, lbs | 2.3 | 2.0 |
| Hot, lbs | 2.2 | 2.0 |
| H-pull, cold, lbs | 14.1 | 15.2 |

*Single-end Strip Adhesion.

The data in the table show that the presence of copper has no adverse effect upon adhesion of the cord to rubber.

EXAMPLE 8

This example demonstrates that fibers prepared from polyester to which the copper salt iodide ion additive has been added, in accordance with this invention, are highly resistant to the formation of free carboxyl groups upon further heating of the fiber. This effect is highly advantageous for tire cords and the like which are exposed to elevated temperatures in use.

A polyethylene terephthalate yarn of polymer prepared as in Example 1d with amounts of additive, based on the weight of polymer, of 0.1% by weight potassium iodide and 32 parts per million copper, is heated in a slow flow of dry nitrogen at 250° C. for periods of 30, 60 and 90 minutes, along with a comparison yarn which does not contain the potassium iodide/copper salt additive. The carboxyl concentrations of the two yarns are determined after each heating period. The results, in Table V, clearly show the superiority of the test yarn over the comparison yarn in resistance to free carboxyl group formation.

TABLE V

| Heating Time (min.) | Test Yarn | | Comparison Yarn | |
|---|---|---|---|---|
| | Carboxyl concentration, Eq./$10^6$ gm. | Cumulative increase, percent | Carboxyl concentration, Eq./$10^6$ gm. | Cumulative increase, percent |
| 0 | 8.5 | | 23.9 | |
| 30 | 10.3 | 21 | 42 | 75 |
| 60 | 11.2 | 32 | 88 | 268 |
| 90 | 10.9 | 28 | 222 | 830 |

EXAMPLE 9

This example illustrates an embodiment of the invention in which solid polymer flake is mixed with powdered additive, remelted, and extruded.

Twenty pounds (9.1 kg.) of polyethylene terephthalate flake having a relative viscosity of 50 is dried under high vacuum for 16 hours and then blended with 9.1 grams of powdered potassium iodide and 4.5 grams of powdered copper stearate (corresponding to 0.1% KI and 50 p.p.m. Cu in the polymer). The coated flake is then remelted in a screw melter and immediately spun at a temperature of 297–320° C. to give a yarn having an average RV of 31.9 and an average carboxyl concentration of 47.4 equivalents per $10^6$ grams. A comparison yarn, spun from the same polymer batch but not coated with the KI/copper stearate powder, is found to have a relative viscosity of 33.6 and a carboxyl concentration of 52.1 eq./$10^6$ gm. These data show a definite decrease in the carboxyl content of the test yarn, relative to the comparison yarn, even though only a short reaction time is available during remelting and spinning.

EXAMPLE 10

This example shows the advantage is hydrolytic stability to be gained by reducing the free carboxyl concentration in a polyester yarn in accordance with this invention.

Polyester flake prepared as in Example 1d with amounts of additive, based on the weight of polymer, of 32 p.p.m. copper and 0.1% KI, and polyester flake of Example 1f (no additive) are each melt-spun into yarn and twisted into tire cord. Cord sample 1d of this invention is found to have a free carboxyl concentration of 8.5 eq./$10^6$ gm. while the comparison cord 1f has a carboxyl concentration of 24 eq./$10^6$ gm. Both cord samples are washed free of finish and subjected to a hydrolyzing atmosphere of steam at a temperature of 160° C. and a pressure of 1 atmosphere for a period of 24 hours. Breaking strengths of each sample are determined before and after the hydrolyzing treatment with the results shown in Table VI. The superiority of the sample prepared in accordance with this invention is evident from the inspection of the data in the table.

TABLE VI

| Sample | Breaking Strength (lbs.) | | Percent Loss in Strength |
|---|---|---|---|
| | Initial | After Treatment | |
| Cord 1d (with additive) | 22.7 | 17.1 | 25 |
| Cord 1f (no additive) | 23.5 | 14.2 | 40 |

Although the invention has been illustrated with specific reference to polyethylene terephthalate in the above axamples, it will be appreciated that substantially the same reduction in carboxyl group concentration and improvement in hydrolytic stability may be obtained when using other linear condensation polyesters suitable for the preparation of similarly usefully shaped structures.

Polyester yarns and cords prepared in accordance with this invention are useful as reinforcing elements not only in pneumatic tires and V-belts, but in many other types of reinforced rubber articles. Their particular advantage appears when the rubber article is exposed to a high temperature for a long period of time. Illustrative of the rubber articles which may be reinforced with the polyester yarns and cords of this invention are flat belts, tarpaulins and other rubber-coated fabrics, hydraulic hoses for use in automobiles and other vehicles, reinforced rubber bellows in airspring suspension systems for vehicles, fire hoses, steam hoses, and the like. Other uses requiring enhanced resistance to hydrolytic degradation will be apparent to those skilled in the art.

It will be apparent that many widely different embodiments of this invention may be made without departing from the spirit and scope thereof, and therefore it is not intended to be limited except as indicated in the appended claims.

I claim:

1. In the preparation of shaped articles of synthetic linear terephthalate condensation polyester, the method of providing a reduction in the free carboxyl content of the polyester which comprises adding to the polyester a copper salt of an organic carboxylic acid and an alkali metal iodi,e the copper salt being added to the polyester after polymerization of the polyester to a relative viscosity of at least 25, when determined for a 10% solution of polyester in phenol/trichlorophenol at 25° C., and being added in an amount providing 15 to 400 parts per million of copper based on the weight of polyester, the alkali metal iodide being added to the polyester in an amount providing a mol ratio of iodide ion to copper salt of about 3:1 to 20:1, mixing the polyester in molten form with the additives until the free carboxyl content of the polyester is substantially reduced, and then melt extruding the shaped article from the polyester.

2. The method as defined in claim 1 wherein the copper salt is added in an amount providing 25 to 50 parts per million of copper in the polyester.

3. The method as defined in claim 1 wherein the alkali metal iodide is added to the polyester in a mol ratio of at least 5:1 relative to the amount of copper salt added.

4. The method of defined in claim 1 wherein the alkali metal iodide and the copper salt are added to the polyester at the same time.

5. The method as defined in claim 1 wherein the alkali metal iodide is added during preparation of the polyester before completion of the polymerization to said high molecular weight.

6. The method as defined in claim 1 wherein the copper salt is added to the polyester as a salt of an organic carboxylic acid of the structure $$R(COOH)_y$$

where R is a hydrocarbon group of 1 to 20 carbon atoms and y is 1 to 2.

7. The method as defined in claim 6 wherein said copper salt is added to polyester having a relative viscosity of at least 25 and the polyester is melt spun into high strength fibers, said relative viscosity being determined for a 10% solution of polyester in a mixture of 10 parts phenol and 7 parts trichlorophenol by weight at 25° C.

References Cited
UNITED STATES PATENTS

| | | | |
|---|---|---|---|
| 2,705,227 | 3/1955 | Stamatoff | 260—45.7 |
| 3,035,026 | 5/1962 | Stephens | 260—75 |
| 3,051,212 | 8/1962 | Daniels | 260—75 |
| 3,219,604 | 11/1965 | Fischer | 260—22 |
| 3,282,892 | 11/1966 | Griehl et al. | 260—45.75 |
| 3,300,447 | 1/1967 | Thoma et al. | 260—75 |
| 3,318,827 | 5/1967 | Whittaker | 260—45.75 |
| 3,324,078 | 6/1967 | Matsui | 260—45.75 |

DONALD E. CZAJA, *Primary Examiner.*

R. W. GRIFFIN, *Assistant Examiner.*

U.S. Cl. X.R.

20—45.7, 45.75, 75; 264—176

UNITED STATES PATENT OFFICE
CERTIFICATE OF CORRECTION

Patent No. 3,446,766                                  May 27, 1969

Robert Edward Taylor

It is certified that error appears in the above identified patent and that said Letters Patent are hereby corrected as shown below:

Column 8, line 70, "iodi,e" should read -- iodide --.
Column 9, line 3, "3:1" should read -- 2:1 --; line 13, "of" should read -- as --.

Signed and sealed this 17th day of February 1970.

(SEAL)
Attest:

Edward M. Fletcher, Jr.                      WILLIAM E. SCHUYLER, JR.
Attesting Officer                                Commissioner of Patents